US007418335B2

(12) United States Patent
Barnes et al.

(10) Patent No.: US 7,418,335 B2
(45) Date of Patent: Aug. 26, 2008

(54) METHOD AND SYSTEM FOR ESTIMATING INJECTOR FUEL TEMPERATURE

(75) Inventors: Travis E. Barnes, Metamora, IL (US); Rammohan Sankar, Peoria, IL (US); Yongxiang Li, Peoria, IL (US); Jialing Chen, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 133 days.

(21) Appl. No.: 11/443,306

(22) Filed: May 31, 2006

(65) Prior Publication Data

US 2007/0277786 A1 Dec. 6, 2007

(51) Int. Cl.

| | |
|---|---|
| ***G06F 17/00*** | (2006.01) |
| ***F02M 57/00*** | (2006.01) |
| ***F02M 51/00*** | (2006.01) |

(52) U.S. Cl. ........................ 701/103; 701/104; 123/480

(58) Field of Classification Search ................ 123/445, 123/446, 456–458, 478, 480, 516–520; 701/101–105, 701/110–115; 73/117.3, 118.1, 117.2
See application file for complete search history.

(56) References Cited

U.S. PATENT DOCUMENTS 5,474,054 A 12/1995 Povinger et al.
5,586,538 A 12/1996 Barnes
5,586,539 A * 12/1996 Yonekawa et al. .......... 123/458
5,865,158 A 2/1999 Cleveland et al.
6,109,244 A 8/2000 Yamamoto et al.
6,138,642 A 10/2000 Zhang et al.
6,408,825 B1 * 6/2002 Enoki et al. ................. 123/467
6,698,401 B2 * 3/2004 Suzuki et al. ............... 123/516
6,807,851 B2 * 10/2004 Wakahara et al. .......... 73/118.1
7,006,910 B2 * 2/2006 Schuricht et al. ............ 701/105

(Continued)

FOREIGN PATENT DOCUMENTS

JP 2001012291 A * 1/2001 ................. 701/103

(Continued)

OTHER PUBLICATIONS

HOWTO Lesson 2 : Creating .DLL's, http://www.thevbzone.com/1_ldd.htm, dated May 3, 2006, 17 pages.

(Continued)

*Primary Examiner*—Willis R. Wolfe, Jr.
(74) *Attorney, Agent, or Firm*—Finnegan, Henderson, Farabow, Garrett & Dunner

(57) ABSTRACT

A fuel system for an engine is disclosed. The fuel system has a source of pressurized fuel, a plurality of fuel injectors, and a common manifold configured to distribute pressurized fuel from the source to the plurality of fuel injectors. The fuel system also has a first sensor located upstream of the common manifold, and a second sensor associated with the engine. The first sensor is configured to generate a first signal indicative of a fuel temperature. The second sensor is configured to generate a second signal indicative of a speed of the engine. The fuel system further has a controller in communication with the first and second sensors. The controller is configured to estimate a fuel temperature at each of the plurality of fuel injectors based on the first signal, the second signal, and the position of the plurality of fuel injectors along the common manifold.

20 Claims, 2 Drawing Sheets

U.S. PATENT DOCUMENTS

| | | | | |
|---|---|---|---|---|
| 7,140,241 | B2 * | 11/2006 | Wakahara | 73/118.1 |
| 7,263,973 | B2 * | 9/2007 | Akita et al. | 123/431 |
| 2006/0037586 | A1 | 2/2006 | Fritsch et al. | |

FOREIGN PATENT DOCUMENTS

| | | | | |
|---|---|---|---|---|
| JP | 2005248737 A | * | 9/2005 | 701/103 |

OTHER PUBLICATIONS

The DLL Zone, "What Are DLLs?" http://www.forunecity.com/skyscrapter/fortune/570/what.html dated Apr. 26, 2006, 2 pages.

The DLL Zone, "Why I Like DLLs" http://www.fortunecity.com/skyscraper/fortune/570/why.html dated Apr. 26, 2006, 3 pages.

Raghav Nayak, "Datasets in Microsoft.Net," Dated Mar. 24, 2004, 8 pages.

"How To Write DLLs Using Visual C++," http://www.geocities.com/sujitmanolikar/dllhowto.html?20063 dated May 3, 2006, 4 pages.

".NET Framework" http://en.wikipedia.org/wiki/.net_framework dated Apr. 14, 2006, 10 pages.

"Dynamic-Link Library" http://en.wikipedia.org/wiki/Dynamic_Link_Library dated Apr. 14, 2006, 7 pages.

PCT International Search Report for International Appln. No. PCT/US2007/009318, mailed Sep. 10, 2007 5 pages.

* cited by examiner

METHOD AND SYSTEM FOR ESTIMATING INJECTOR FUEL TEMPERATURE

TECHNICAL FIELD

The present disclosure is directed to a control system and method and, more particularly, to a system and method for estimating the temperature of fuel flowing through individual injectors of an engine and for controlling the injectors in response thereto.

BACKGROUND

Internal combustion engines such as diesel engines, gasoline engines, and gaseous fuel-powered engines use injectors to introduce fuel into the combustion chambers of the engine. As the fuel is pressurized, directed through portions of the engine to individual injectors, and returned from the injectors, the fuel absorbs heat from its surroundings and from the work exerted on the fuel. As the fuel is heated, properties of the fuel affecting injection characteristics change. In addition, because fuel heating throughout the engine can vary during operation of the engine, the fuel temperature and, thus, the injection characteristics at one injector may be different from the fuel temperature and injection characteristics at another injector. If these varying temperature and injection characteristics are not accounted for during operation of the engine, the injection of fuel into the engine and subsequent operation of the engine may be unpredictable.

In order to account for these fuel temperature and injection characteristic changes, engine manufacturers have attempted to estimate the fuel temperature at each injector. One such example is disclosed in U.S. Pat. No. 5,865,158 (the '158 patent) issued to Cleveland et al. on Feb. 2, 1999. The '158 patent describes a method and system for controlling the injection of fuel across a plurality of fuel injectors coupled together along a fuel rail in an internal combustion engine. The method includes producing a reference fuel delivery control signal for each fuel injector as a function of a desired fuel mass to be injected. The method further includes adjusting the pulse width of each fuel delivery control signal as a function of the fuel temperature proximate each of the fuel injectors. The temperature of the fuel proximate each injector is ascertained by first measuring the temperature of the fuel near the inlet of the fuel rail. This measured temperature is then offset based on the location of the fuel injector along the rail to determine the temperature of the fuel proximate each injector.

Although the method and system of the '158 patent may estimate the fuel temperature at each injector and control operation of the injectors in response thereto, it may lack accuracy. In particular, the 158 system does not take into account fuel that is directed to other fuel-powered engine accessories or the effect their operation may have on fuel temperature. In addition, the 158 patent does not take into account the current steady-state or transient operation of the engine when determining fuel temperature.

The system and method of the present disclosure solves one or more of the problems set forth above.

SUMMARY OF THE INVENTION

One aspect of the present disclosure is directed to a fuel system for an engine. The fuel system includes a source of pressurized fuel, a plurality of fuel injectors, and a common manifold configured to distribute pressurized fuel from the source to the plurality of fuel injectors. The fuel system also includes a first sensor located upstream of the common manifold, and a second sensor associated with the engine. The first sensor is configured to generate a first signal indicative of a fuel temperature. The second sensor is configured to generate a second signal indicative of a speed of the engine. The fuel system further includes a controller in communication with the first and second sensors. The controller is configured to estimate a fuel temperature at each of the plurality of fuel injectors based on the first signal, the second signal, and an position of the plurality of fuel injectors along the common manifold.

Another aspect of the present disclosure is directed to a method of injecting fuel into an engine. The method includes pressurizing fuel, sensing a temperature of the pressurized fuel, and distributing the pressurized fuel to a plurality of sequential locations. The method also includes sensing a speed of the engine, and estimating a temperature of the fuel at each of the plurality of sequential locations based on the sensed temperature, the sensed speed, and the sequence of the plurality of sequential locations.

DETAILED DESCRIPTION

Figure 1:
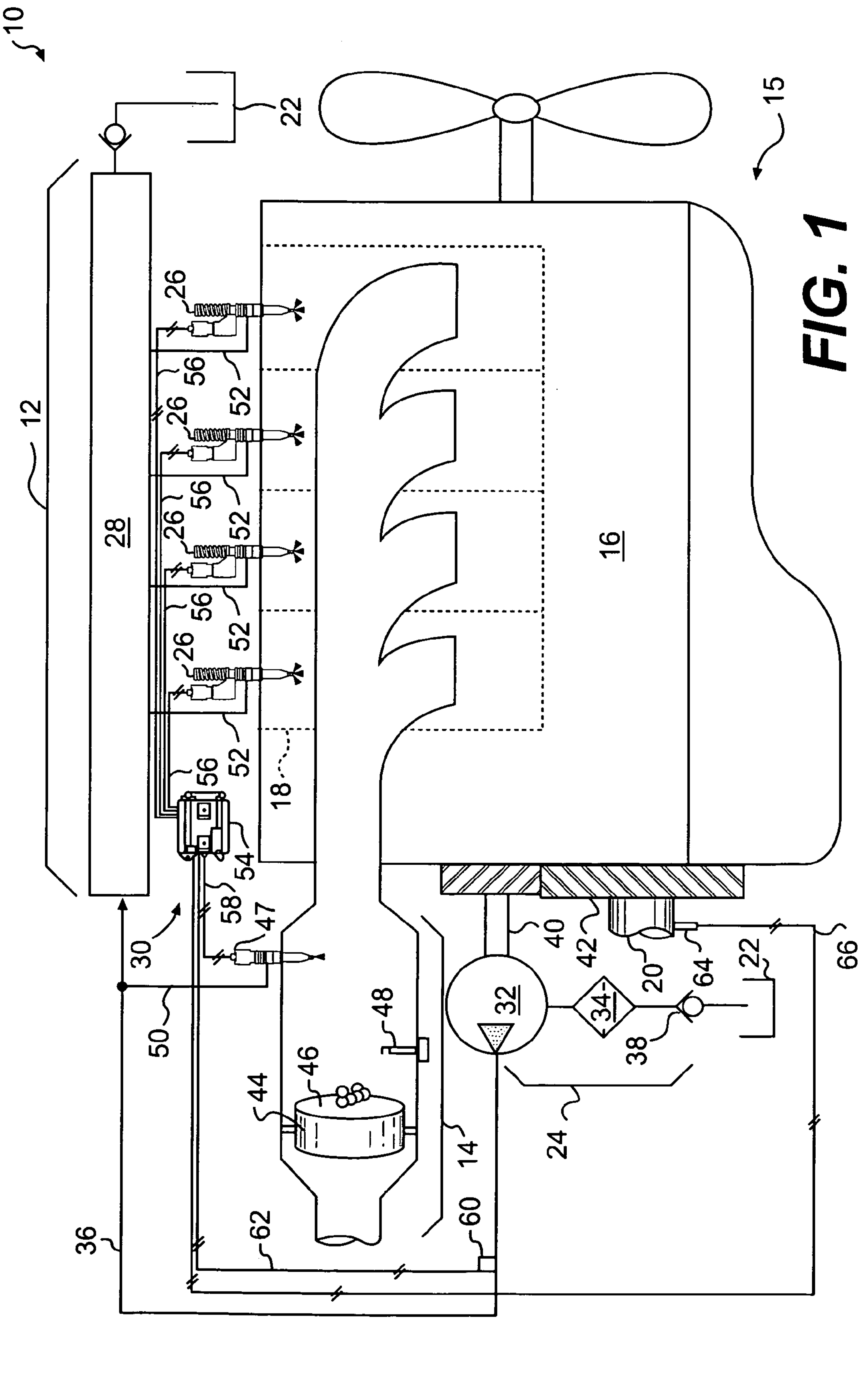
FIG. 1 is a schematic and diagrammatic illustration of an exemplary disclosed fuel system.

FIG. 1 illustrates a power system 10 having a common manifold injection system 12 and a particulate regeneration system 14. For the purposes of this disclosure, power system 10 is depicted and described as including a four-stroke diesel engine 15. One skilled in the art will recognize, however, that power system 10 may include any other type of internal combustion engine such as, for example, a gasoline or gaseous fuel-powered engine. Engine 15 may include a block 16 that at least partially defines a plurality of combustion chambers 18. In the illustrated embodiment, engine 15 includes four combustion chambers 18. However, it is contemplated that engine 15 may include a greater or lesser number of combustion chambers 18 and that combustion chambers 18 may be disposed in an "in-line" configuration, a "V" configuration, or in any other suitable configuration.

As also shown in FIG. 1, engine 15 may include a crankshaft 20 that is rotatably disposed within block 16. A connecting rod (not shown) associated with each combustion chamber 18 may connect a piston (not shown) to crankshaft 20 so that a sliding motion of each piston within the respective combustion chamber 18 results in a rotation of crankshaft 20. Similarly, a rotation of crankshaft 20 may result in a sliding motion of the pistons.

Common manifold injection system 12 may include components that cooperate to deliver injections of pressurized fuel into each combustion chamber 18. Specifically, common manifold injection system 12 may include a tank 22 configured to hold a supply of fuel, a fuel pumping arrangement 24 configured to pressurize the fuel and direct the pressurized fuel to a plurality of fuel injectors 26 by way of a common manifold 28, and a control system 30.

Tank 22 may constitute a reservoir configured to hold a supply of fuel. One or more systems within power system 10 may draw fuel from and return fuel to tank 22. It is contemplated that common manifold injection system 12 may be connected to multiple separate fuel tanks, if desired.

Fuel pumping arrangement 24 may include one or more pumping devices 32 connected in series with a filtration member 34 and common manifold 28. In one example, pumping device 32 may embody a low pressure source such as a transfer pump that provides low pressure feed to common manifold 28 via a fuel line 36. A check valve 38 may be disposed within fuel line 36 upstream of pumping device 32 to provide for unidirectional fuel flow from tank 22 through fuel pumping arrangement 24 to common manifold 28. It is contemplated that fuel pumping arrangement 24 may include additional and/or different components than those listed above such as, for example, a high pressure source disposed in series with the low pressure source, if desired.

Pumping device 32 may be operatively connected to and driven by crankshaft 20. Pumping device 32 may be connected with crankshaft 20 in any manner readily apparent to one skilled in the art where a rotation of crankshaft 20 will result in a corresponding rotation of a pump driveshaft. For example, a pump driveshaft 40 of pumping device 32 is shown in FIG. 1 as being connected to crankshaft 20 through a gear train 42. It is contemplated, however, that pumping device 32 may alternatively be driven electrically, hydraulically, pneumatically, or in another appropriate manner.

Fuel injectors 26 may be disposed within cylinder heads (not shown) of engine 15 and sequentially fluidly connected to common manifold 28. Fuel injectors 26 may be directly connected to common manifold 28 such that all of the fuel flowing through common manifold 28 also flows through each individual injector or, alternatively, fuel injectors 26 may be connected to common manifold 28 by a plurality of fuel lines 52. Each fuel injector 26 may be operable to inject an amount of pressurized fuel into an associated combustion chamber 18 at predetermined timings, fuel pressures, and quantities. The timing of fuel injection into combustion chamber 18 may be synchronized with the motion of a piston (not shown) reciprocatingly disposed therein. For example, fuel may be injected as the piston nears a top-dead-center position in a compression stroke to allow for compression-ignited-combustion of the injected fuel. Alternatively, fuel may be injected as the piston begins the compression stroke heading towards a top-dead-center position for homogenous charge compression ignition operation. Fuel may also be injected as the piston is moving from a top-dead-center position towards a bottom-dead-center position during an expansion stroke for a late post injection to create a reducing atmosphere for aftertreatment regeneration.

Control system 30 may control operation of each fuel injector 26 in response to one or more inputs. In particular, control system 30 may include a controller 54 that communicates with fuel injectors 26 by way of a plurality of communication lines 56, with a temperature sensor 60 by way of a communication line 62, and with a speed sensor 64 by way of a communication line 66. Controller 54 may control a fuel injection timing, duration, pressure, amount, and/or other injection characteristics by applying a determined current waveform or sequence of determined current waveforms to each fuel injector 26. The shape and magnitude of the waveforms may be based on the input received from, among other sources, temperature sensor 60, and speed sensor 64.

Controller 54 may embody a single microprocessor or multiple microprocessors that include a means for controlling an operation of fuel injector 26. Numerous commercially available microprocessors can be configured to perform the functions of controller 54. It should be appreciated that controller 54 could readily embody a general machine or engine microprocessor capable of controlling numerous machine or engine functions. Controller 54 may include all the components required to run an application such as, for example, a memory, a secondary storage device, and a processor, such as a central processing unit or any other means known in the art for controlling fuel injectors 26. Various other known circuits may be associated with controller 54, including power supply circuitry, signal-conditioning circuitry, solenoid driver circuitry, communication circuitry, and other appropriate circuitry.

One or more maps relating engine speeds, injection amounts, fuel rates, and fuel temperatures may be stored in the memory of controller 54. Each of these maps may be in the form of tables, graphs, and/or equations. In one example, engine speed, a rate of fuel exiting common manifold 28, and an injection amount per engine revolution may form the coordinate axis of a 3-D table used for determining a steady state heat rise value. Engine speed and the injection amount may be related to a transient heat rise value in another 2-D map. In addition, a common manifold fuel outlet temperature, a common manifold limited inlet fuel temperature, and a sequential location of fuel injectors 26 may be referenced with another 3-D map to determine a temperature of fuel at a particular fuel injector location. It is also contemplated that fuel injection characteristics such as start of injection, pulse width, current magnitude, pressures, end of injection, shot mode, dwell between shots, and other such injection characteristics may be related to the individual injector fuel temperatures in a final 2-D map, if desired.

Temperature sensor 60 may be mounted within common manifold injection system 12 at a location upstream of common manifold 28 to sense the temperature of fuel pressurized by pumping device 32. For example, temperature sensor 50 may embody a surface-type temperature sensor that measures a wall temperature of fuel line 36, a liquid-type temperature sensor that directly measures the temperature of the fuel within fuel line 36 or tank 22, or any other type of sensor known in the art. Temperature sensor 60 may generate a fuel temperature signal and send this signal to controller 54 via communication line 62. This temperature signal may be sent continuously, on a periodic basis, or only when prompted to do so by controller 54.

Speed sensor 64 may sense a rotational speed of engine 15. For example, speed sensor 64 may embody a magnetic pickup sensor configured to sense a rotational speed of crankshaft 20 and produce a corresponding speed signal. Speed sensor 64 may be disposed proximal a magnetic element (not shown) embedded within crankshaft 20, proximal a magnetic element (not shown) embedded within a component directly or indirectly driven by crankshaft 20, or disposed in other suitable manner to produce a signal corresponding to the rotational speed of the resulting magnetic field. The power source speed signal may be sent to controller 54 by way of communication line 66.

Particulate regeneration system 14 may be associated with an exhaust treatment device 44. In particular, as exhaust from engine 15 flows through exhaust treatment device 44, particulate matter may be removed from the exhaust flow by wire mesh or ceramic honeycomb filtration media 46. Over time, the particulate matter may build up in filtration media 46 and, if left unchecked, the particulate matter buildup could be significant enough to restrict, or even block the flow of exhaust through exhaust treatment device 44, allowing for backpressure within engine 15 to increase. An increase in the backpressure of engine 15 could reduce the system's ability to draw in fresh air, resulting in decreased performance, increased exhaust temperatures, and poor fuel consumption.

Particulate regeneration system 14 may include components that cooperate to periodically reduce the buildup of particulate matter within exhaust treatment device 44. These components may include, among other things, one or more regeneration injectors 47 and a spark plug 48. It is contemplated that particulate regeneration system 14 may include additional or different components such as, for example, an air injection system, a pressure sensor, a temperature sensor, a flow sensor, a flow blocking device, and other components known in the art.

Regeneration injector 47 may be disposed within a housing of exhaust treatment device 44, connected to fuel line 36 by way of a branch passageway 50, and in communication with controller 54 via a communication line 58. Regeneration injector 47 may be operable to inject an amount of pressurized fuel into the exhaust flowing through treatment device 44 at predetermined timings, fuel pressures, and fuel flow rates. The timing of fuel injection into exhaust treatment device 44 may be synchronized with sensory input received from an exhaust temperature sensor (not shown), one or more exhaust pressure sensors (not shown), a timer (not shown), or other similar sensory devices such that the injections of fuel substantially correspond with a buildup of particulate matter within exhaust treatment device 44. For example, fuel may be injected as a pressure of the exhaust flowing through exhaust treatment device 44 exceeds a predetermined pressure level or a pressure drop across filtration media 46 exceeds a predetermined differential value. Alternatively or additionally, fuel may be injected as the temperature of the exhaust flowing through filtration media 46 deviates from a desired temperature by a predetermined value. It is further contemplated that fuel may also be injected on a set periodic basis, in addition to or regardless of pressure or temperature conditions, if desired. The operation of regeneration injector 47 may be controlled by, or at least monitored by controller 54 via communication line 58. In this manner, controller 54 may regulate the operation of fuel injectors 26 in further response to the actuation of regeneration injector 47 and the amount of fuel consumed by regeneration injector 47.

Spark plug 48 may facilitate ignition of fuel sprayed from regeneration injector 47 into the exhaust flow during a regeneration event. Specifically, during a regeneration event, the temperature of the exhaust exiting engine 15 may be too low to cause auto-ignition of the particulate matter trapped within filtration media 46 or of the fuel sprayed from regeneration injector 47. To initiate combustion of the fuel and, subsequently, the trapped particulate matter, a quantity of fuel from regeneration injector 47 may be sprayed or otherwise injected toward spark plug 48 to create a locally rich atmosphere readily ignitable by spark plug 48. A spark developed across electrodes of spark plug 48 may ignite the locally rich atmosphere creating a flame, which may be jetted or otherwise advanced toward filtration media 46, thereby raising the temperature within exhaust treatment device 44 to a level that causes ignition of the particulate matter trapped within filtration media 46.

Figure 2:
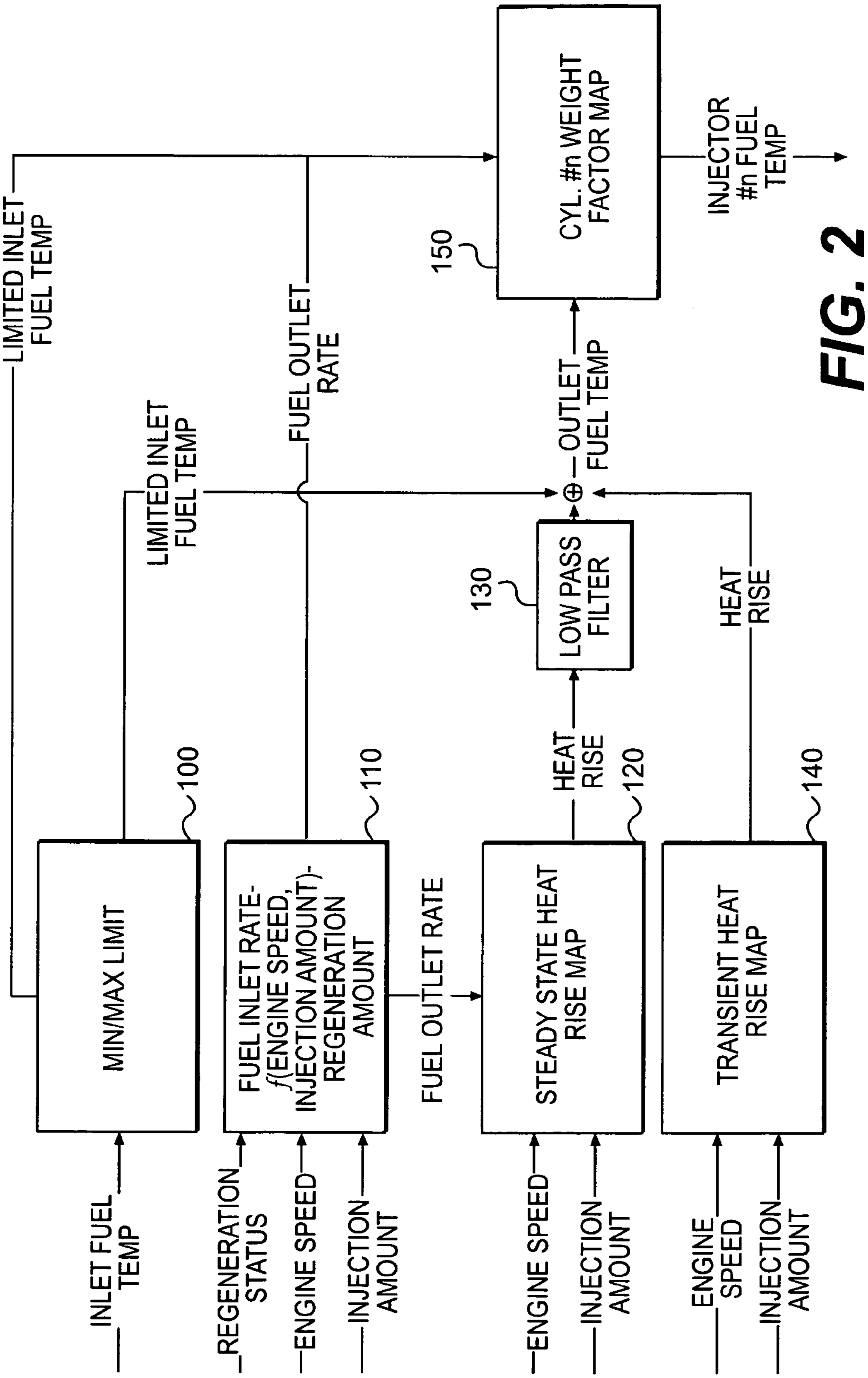
FIG. 2 is a control chart depicting an exemplary method of estimating fuel temperature.

FIG. 2 is a control chart illustrating an exemplary method of estimating a fuel temperature at each fuel injector 26 for use in controlling an operation of fuel injector 26. FIG. 2 will be discussed in detail below.

INDUSTRIAL APPLICABILITY

The fuel control system of the present disclosure has wide application in a variety of engine types including, for example, diesel engines, gasoline engines, and gaseous fuel-powered engines. The disclosed fuel control system may be implemented into any engine where consistent, accurate fuel injector performance throughout a range of operating fuel temperatures is important. The operation of control system 30 will now be explained.

As indicated in the control chart of FIG. 2, four different inputs may be received by controller 54 in preparation for a fuel injection event. These four different inputs may include the temperature signal received from sensor 60 via communication line 62, the status of regeneration injector 47 monitored via communication line 58, the speed signal received from sensor 64 via communication line 66, and a fuel injection amount determined or monitored by controller 54. The fuel injection amount may be an amount of fuel injected by fuel injectors 26 during a single revolution of crankshaft 20. This fuel injection amount may be based on an operator input, a load on engine 15, a speed of engine 15, and other related engine, transmission, or machine related parameters, and determined through the use of one or more maps, equations, graphs, and/or tables stored within the memory of controller 54. It is contemplated that the fuel injection amount may correspond with a current injection event, the next desired injection event, or the immediately past injection event.

As indicated by control box 100 of FIG. 2, controller 54 may determine if the fuel inlet temperature value (e.g., the temperature of fuel entering common manifold 28) from sensor 60 falls within a predetermined range of temperatures. In one exemplary embodiment, the predetermined range of temperatures may be about 0-100 degrees Celsius. If the temperature value from sensor 60 deviates from this predetermined range, the temperature value utilized for further calculation may be limited to the corresponding minimum or maximum of the predetermined range. For example, if the sensed temperature is −5 or 105 degrees Celsius, the temperature value utilized for further calculation (e.g., the Limited Inlet Fuel Temperature), may be limited to 0 or 100 degrees Celsius, respectively.

As indicated by control box 110, controller 54 may determine a Fuel Outlet Rate based on a Regeneration Status, the speed signal from sensor 64, and the Injection Amount described above. The Regeneration Status may be related to the current operation of regeneration injector 47. In particular, if regeneration injector 47 is currently injecting fuel into particulate regeneration system 14, the amount of fuel pressurized by pumping device 32 that actually enters common manifold 28 may be less than if regeneration injector 47 is not currently injecting fuel because of regeneration consumption combined with a decrease in pumping device efficiency. To calculate the Fuel Outlet Rate (e.g., the rate of fuel flowing out of common manifold 28), controller 54 may subtract the rate of fuel injected by fuel injectors 26 and the rate of fuel injected by regeneration injector 47 (if regeneration injector 47 is active) from the rate at which fuel is being pressurized by fuel pumping arrangement 24. The rate that fuel is being pressurized by fuel pumping arrangement 24 may be calculated based on a known capacity of fuel pumping arrangement 24 and the rotational speed of crankshaft 20 or, alternatively, found by referencing the rotational speed of crankshaft 20 with a relationship map stored within the memory of controller 54. The amount of fuel used by regeneration injector 47 to regenerate filtration media 46 may be a fixed amount that is always injected during regeneration or, alternatively, may be based on a filtration media or engine performance parameter.

As indicated by control box 120, controller 54 may determine a steady state Heat Rise value based on the Fuel Outlet Rate described above, the speed signal from sensor 64, and the Injection Amount described above. Controller 54 may reference these input values with the Steady State Heat Rise Map stored within the memory of controller 54 to determine the corresponding steady state Heat Rise value. The Heat Rise Value may relate to the amount of heat added to the fuel flowing through engine 15 as engine 15 is operating at a particular steady output speed and load. The injection amount may be indicative of the load on engine 15. For a given engine speed, injection amount, and fuel outlet rate, there may exist a single corresponding steady state Heat Rise value. As indicated by control box 130, this Heat Rise value may pass through a low pass filter to minimize transient influences.

As indicated by control box 140, controller 54 may determine a transient Heat Rise value based on the speed signal from sensor 64 and the injection amount described above. Controller 54 may reference these input values with the Transient Heat Rise Map stored within the memory of controller 54 to determine the corresponding transient Heat Rise value. The Heat Rise Value may relate to the amount of heat added to the fuel when engine 15 as a result of transient speeds and loads. For a given engine speed and injection amount, there may exist a single corresponding transient Heat Rise value.

Controller 54 may determine a Fuel Outlet Temperature as a function of the filtered steady state Heat Rise value, the transient Heat Rise Value, and the Limited Inlet Fuel Temperature. The Fuel Outlet Temperature value may be representative of the temperature of the pressurized fuel exiting common manifold 28 to return to tank 22. Because of the fuel path through engine 15 and the work performed on the fuel, the Fuel Outlet Temperature value may be much greater than the Limited Inlet Fuel Temperature.

As indicated by control box 150, the temperature of the pressurized fuel flowing through any one of fuel injectors 26 may be determined based on the Fuel Outlet Temperature value, the Limited Inlet Fuel Temperature, and the location of the particular fuel injector 26 along common manifold 28. In particular, because the pressurized fuel flowing through engine 15 may absorb heat along its path through engine 15, the fuel injector 26 located furthest downstream may experience higher temperature fuel than the fuel injector 26 located furthest upstream. In fact, the fuel temperature gradient between the sequentially first and last fuel injectors 26 may be substantially linear in some applications. As a result, the Fuel Outlet Temperature and Limited Inlet Fuel Temperature values may be referenced with a Cylinder Weight Factor Map established during testing of engine 15 to determine the temperature of the fuel at any of the predetermined locations (e.g., the sequential locations of fuel injectors 26) along common manifold 28.

Because control system 30 may account for the operation of fuel powered engine accessories, greater estimation accuracy may be achieved. In particular, because the operation of fuel powered engine accessories such as, for example, regeneration injector 47, may affect the amount of fuel directed through common manifold 28, its operation may also affect the amount of heat transferred between engine 15 and the pressurized fuel. By accounting for this source of additional, or possibly reduced, heat load, the accuracy of estimating the temperatures within common manifold injection system 12 may be improved.

Additional estimation accuracy may be attained by considering the current steady state and transient operation of engine 15. In particular, because the speed and load of engine 15 can affect the temperature of engine 15 and the flow rates of pressurized fuel consumed or passed through common manifold injection system 12, the heat load transferred between engine 15 and the pressurized fuel may likewise be affected. By also accounting for this source of additional, or possibly reduced, heat load, the estimation accuracy of control system 30 may be further enhanced.

It will be apparent to those skilled in the art that various modifications and variations can be made to the fuel injector and control system of the present disclosure without departing from the scope of the disclosure. Other embodiments will be apparent to those skilled in the art from consideration of the specification and practice of the fuel injector and control system disclosed herein. For example, although substantially more expensive, it is contemplated that instead of estimating common manifold inlet and outlet temperatures, the inlet and outlet temperatures may alternatively be directly sensed. It is intended that the specification and examples be considered as exemplary only, with a true scope of the disclosure being indicated by the following claims and their equivalents.

What is claimed is:

1. A fuel system for an engine, comprising:
- a source of pressurized fuel;
- a plurality of fuel injectors;
- a common manifold configured to distribute pressurized fuel from the source to the plurality of fuel injectors;
- a first sensor located upstream of the common manifold and being configured to generate a first signal indicative of a fuel temperature;
- a second sensor associated with the engine and being configured to generate a second signal indicative of a speed of the engine; and
- a controller in communication with the first and second sensors, the controller being configured to estimate a fuel temperature at each of the plurality of fuel injectors based on the first signal, the second signal, and a position of the plurality of fuel injectors along the common manifold.

2. The fuel system of claim 1, wherein the fuel temperature at each of the plurality of fuel injectors is further estimated based on an amount of fuel injected by the plurality of fuel injectors per engine revolution.

3. The fuel system of claim 1, wherein the controller is further configured to limit the sensed fuel temperature to within a predetermined range.

4. The fuel system of claim 1, wherein the controller is further configured to control operation of the plurality of fuel injectors based at least partially on the estimated temperature.

5. The fuel system of claim 1, wherein the controller includes a memory having a first map stored therein relating the first signal and an amount of fuel injected by the plurality of fuel injectors per engine revolution to a steady state heat rise amount.

6. The fuel system of claim 5, wherein the memory of the controller also has a second map stored therein relating the first signal and the amount of fuel injected by the plurality of fuel injectors per engine revolution to a transient heat rise amount.

7. The fuel system of claim 1, wherein the fuel temperature at each of the plurality of fuel injectors is further estimated based on an amount of fuel consumed by an engine accessory.

8. The fuel system of claim 7, wherein the engine accessory includes a particulate regeneration device.

9. The fuel system of claim 7, wherein the controller is configured to:
- determine a flow rate of fuel into the common manifold based on the second signal and the amount of fuel consumed by the engine accessory; and
- determine a flow rate of fuel returning from the common manifold to the source based on the determined flow rate of fuel into the common manifold, the second signal, and an amount of fuel injected by the plurality of fuel injectors per engine revolution.

10. A method of injecting fuel into an engine, comprising:

pressurizing fuel;

sensing a temperature of the pressurized fuel;

distributing the pressurized fuel to a plurality of sequential locations;

sensing a speed of the engine; and estimating a temperature of the fuel at each of the plurality of sequential locations based on the sensed temperature, the sensed speed, and the sequence of the plurality of sequential locations.

11. The method of claim 10, further including injecting pressurized fuel into the engine at each of the plurality of sequential locations, wherein the step of estimating a temperature is further based on a quantity of the pressurized fuel injected into the engine per engine revolution.

12. The method of claim 10, further including:

combusting pressurized fuel to produce a power output and a flow of exhaust;

collecting particulate matter from the flow of exhaust; and directing pressurized fuel to the collected particulate matter to combust the collected particulate matter, wherein the step of estimating a temperature is further based on an amount of the pressurized fuel directed to the collected particulate matter.

13. The method of claim 12, further including:

determining an amount of fuel pressurized;

determining an amount of the pressurized fuel directed to the collected particulate matter; and determining an amount of unused pressurized fuel based on the determined amount of fuel pressurized, the determined amount of fuel directed to the collected particulate matter, the sensed engine speed, and an amount of pressurized fuel injected per engine revolution.

14. The method of claim 10, wherein the step of estimating a temperature includes referencing the sensed engine speed and an amount of pressurized fuel injected per engine revolution with a first map to determine a steady state heat rise amount.

15. The method of claim 14, wherein the step of estimating further includes referencing the sensed engine speed and the amount of pressurized fuel injected per engine revolution with a second map to determine a transient heat rise amount.

16. An internal combustion engine, comprising:

a source of pressurized fuel;

a plurality of fuel injectors;

a common manifold configured to distribute pressurized fuel from the source to the plurality of fuel injectors;

a block forming a plurality of combustion chambers, the combustion chambers configured to receive injections of pressurized fuel from the plurality of fuel injectors and produce a power output and a flow of exhaust;

a filter configured to remove particulate matter from the flow of exhaust;

a regeneration device configured to inject pressurized fuel into the flow of exhaust to selectively regenerate the filter;

a first sensor located upstream of the common manifold and being configured to generate a first signal indicative of a fuel temperature;

a second sensor configured to generate a second signal indicative of a speed of the engine; and a controller in communication with the first and second sensors, the controller being configured to:

estimate a fuel temperature at each of the plurality of fuel injectors based on the first signal, the second signal, a position of the plurality of fuel injectors along the common manifold, and an amount of fuel injected by the regeneration device; and control operation of the plurality of fuel injectors based at least partially on the estimated temperature.

17. The engine of claim 16, wherein the controller is configured to:

determine a flow rate of fuel into the common manifold based on the second signal and the amount of fuel injected by the regeneration device; and determine a flow rate of fuel returning from the common manifold to the source based on the determined flow rate of fuel into the common manifold, the second signal, and the amount of fuel injected by the plurality of fuel injectors per engine revolution.

18. The engine of claim 16, wherein the fuel temperature at each of the plurality of fuel injectors is further estimated based on an amount of fuel injected by the plurality of fuel injectors per engine revolution.

19. The engine of claim 18, wherein the controller includes a memory having a first map stored therein relating the first signal and the amount of fuel injected by the plurality of fuel injectors per engine revolution to a steady state heat rise amount.

20. The engine of claim 19, wherein the memory of the controller also has a second map stored therein relating the first signal and the amount of fuel injected by the plurality of fuel injectors per engine revolution to a transient heat rise amount.

* * * * *